United States Patent [19]
Obata

[11] Patent Number: 5,335,100
[45] Date of Patent: Aug. 2, 1994

[54] APPARATUS FOR LIGHTING A LIQUID CRYSTAL ELEMENT

[75] Inventor: Masao Obata, Nara, Japan

[73] Assignee: Sharp Kabushiki Kaisha, Osaka, Japan

[21] Appl. No.: 878,995

[22] Filed: May 6, 1992

[30] Foreign Application Priority Data

May 10, 1991 [JP] Japan .................... 3-032454

[51] Int. Cl.⁵ .................... G02F 1/1335; G02F 1/1333
[52] U.S. Cl. ........................ 359/49; 40/546; 362/27; 359/83
[58] Field of Search ............ 362/31, 27; 359/69, 359/83, 49; 40/546

[56] References Cited

U.S. PATENT DOCUMENTS

| | | | |
|---|---|---|---|
| 3,840,695 | 10/1974 | Fisher | 358/61 |
| 4,789,224 | 12/1988 | Bougsty | 359/49 |
| 4,963,001 | 10/1990 | Miyajima | 359/83 |
| 5,046,826 | 9/1991 | Iwamoto et al. | 362/31 |
| 5,064,276 | 11/1991 | Endo et al. | 362/31 |
| 5,184,888 | 2/1993 | Sakuma et al. | 362/31 |

FOREIGN PATENT DOCUMENTS

| | | |
|---|---|---|
| 54-18886 | 7/1979 | Japan . |
| 64-987 | 1/1989 | Japan . |
| 3-171009 | 7/1991 | Japan . |

Primary Examiner—William L. Sikes
Assistant Examiner—Ron Trice

[57] ABSTRACT

With the aim of reducing the thickness of a liquid crystal lighting apparatus, side ends, different from light incident ends, of an optical conductor plate are cut out to form steps so that the optical conductor plate may be thinner at the side ends than at the light incident ends. Alternatively, portions, contiguous to the light incident ends, of a reflector sheet and a diffusion sheet are cut out to form thickness reduced portions and only the thickness reduced portions are clamped and held by a main body.

17 Claims, 7 Drawing Sheets

APPARATUS FOR LIGHTING A LIQUID CRYSTAL ELEMENT

BACKGROUND OF THE INVENTION (i) Field of the Invention

The present invention relates to a lighting apparatus of an edge light type used for backlighting of a light receiving type liquid crystal display device.

(ii) Description of the Prior Art

In the past, various types of lighting apparatus, used in liquid crystal display devices have already been proposed, including many known apparatuses of a so-called edge light type, disclosed in Japanese Patent Publication No. Sho 54-18886 and Japanese Patent Application Laid-Open No. Hei 3-171009. In these apparatuses wherein light sources are disposed at opposite ends of an optical conductor, and backlighting of the display device is effected indirectly through the optical conductor. Another known apparatus is a so-called backlighting type, disclosed in Japanese Patent Application Laid-open No. Sho 64-987, wherein a light source is disposed directly at the back of an optical conductor. Of these types, the device using a lighting apparatus of the edge light type is advantageous in that the whole display device can be reduced in thickness.

Figure 1:
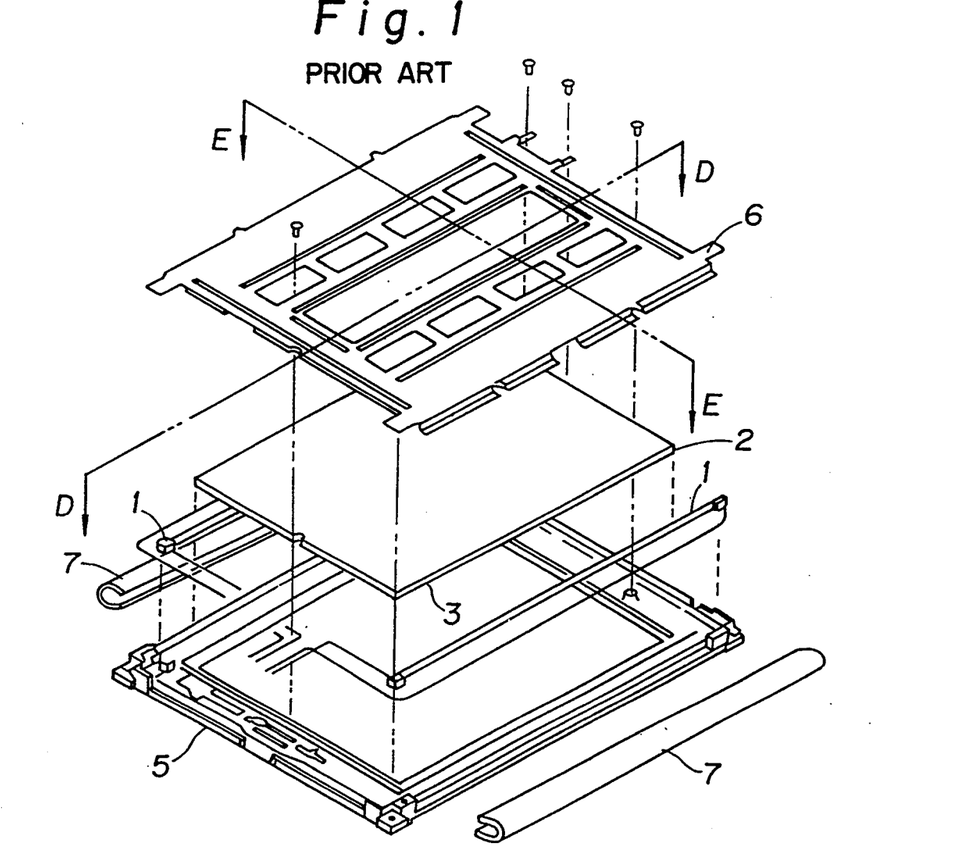
FIG. 1 is a perspective view showing a prior art liquid crystal lighting apparatus.
Figure 2:
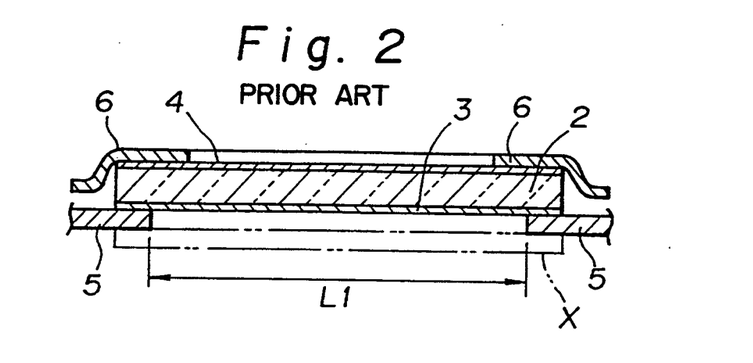
FIG. 2 is a sectional view from the line D—D of FIG. 1.
Figure 3:
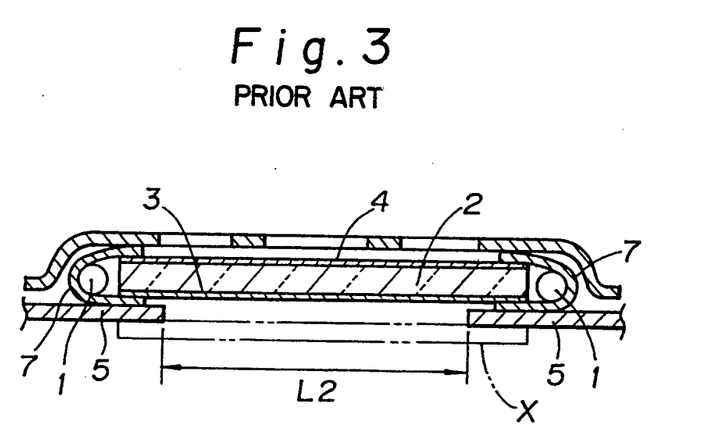
FIG. 3 is a sectional view from the line E—E of FIG. 1.

As shown in FIGS. 1 to 3, in the conventional lighting apparatus of the edge light type used for a liquid crystal display device, lamps such as cold cathode tubes or hot cathode tubes are used as light sources 1. The light sources 1 are disposed at opposite ends of an optical conductor 2 made of a transparent material. Further, a diffusion sheet 3, having a light scattering capability for the sake of making the brightness over the entire illuminating plane uniform, is formed as a milk-white, synthetic resin plate on the top surface of the optical conductor 2. Finally, a mirror reflector or a light scattering acrylic plate is used as a reflector sheet 4. The reflector sheet 4 is adapted to improve the utilization efficiency of light by reflecting light, emitted from the light sources and heading toward the back side, toward the front side.

As shown in FIG. 2, a laminated plate of three layers of the diffusion sheet 3, optical conductor 2 and reflector sheet 4 is clamped and held through its front and back surfaces by a window frame 5 and a support 6 (chassis) fitted to the back of the window frame 5 by screws.

In the Figures, reference character 7 designates light source reflectors for reflecting light, emitted from the light sources and heading toward the outside, back toward the optical conductor 2. Further, X is a liquid crystal display panel, L1 is an effective illuminating area of the light sources 1 and L2 is an effective display area of the liquid crystal display panel X.

In the conventional liquid crystal lighting apparatus, however, the laminated plate of layers of the diffusion sheet 3, optical conductor 2, reflector sheet 4 and light source reflector 7 are overlaid through its front and back with the window frame 5 and the support 6 as shown in FIGS. 2 and 3. Therefore the thickness dimension of the whole liquid crystal lighting apparatus is increased. For example, when thickness dimensions of individual members are exemplified such that the optical conductor has a thickness of 5.0 mm, the diffusion sheet 3 has a thickness of 0.25 mm, the reflector sheet has a thickness of 0.18 mm, the support has a thickness of 0.5 mm and the light source reflector 7 has a thickness of 0.1 mm, a portion shown in FIG. 2 has a thickness of 5.93 mm as measured from the front surface of the window frame 5 and a portion shown in FIG. 3 has a thickness of 6.13 mm as measured from the front surface of the window frame 5. If the thickness of the optical conductor 2 is reduced to accomplish thickness reduction for the whole apparatus, the area of the light incident end surfaces, through which light from the light sources 1 goes into the optical conductor, is decreased correspondingly. Thus, difficulties have arisen in attempting to satisfy the trade-off between the thickness reduction and the realization of high brightness of the liquid crystal lighting apparatus.

SUMMARY OF THE INVENTION

An object of the present invention is to eliminate the aforementioned problems by providing a liquid crystal lighting apparatus which can achieve the thickness reduction without reducing the area of the light incident end surfaces.

This and other objects of the present invention, according to one aspect of the invention, are accomplished by providing a liquid crystal lighting apparatus comprising a lighting apparatus main body arranged rearwardly of a liquid crystal display panel, an optical conductor plate, disposed parallel to the liquid crystal display panel within the lighting apparatus main body, light sources arranged at opposite ends of the optical conductor plate, and a reflector sheet disposed in parallel to, and rearwardly of, the optical conductor plate, for reflecting light toward the liquid crystal display panel. The lighting apparatus main body includes a window frame disposed between the liquid crystal panel and the optical conductor plate and a support disposed rearwardly of the optical conductor plate, so that the optical conductor plate is clamped between the window frame and support. The optical conductor plate is cut out at the back of side ends, different from the opposite ends where the light sources are arranged, of the optical conductor plate to form steps. Further, the support abuts on the steps, and the steps have a depth which set so as to make the thickness between the window frame and the support smaller than the thickness between the window frame and the reflector sheet.

To manufacture the liquid crystal lighting apparatus having the above construction, the portions of the side ends, different from the opposite ends where the light sources are arranged, of the optical conductor plate are stepped to be thinner than the light incident ends. Subsequently, light sources are disposed at the light incident ends of the optical conductor plate. The resulting structure is then placed on the window frame and the support is brought into abutment on the steps to clamp the optical conductor plate.

At that time, by virtue of a large depth of the steps cut in the optical conductor plate, the support can be recessed on the optical conductor plate and can be prevented from projecting rearwardly of the reflector sheet, thus attaining thickness reduction of the apparatus.

According to another aspect of the invention, a liquid crystal lighting apparatus comprises a window frame disposed rearwardly of a liquid crystal display panel, an optical conductor plate disposed rearwardly of the window frame and disposed in parallel with the liquid crystal display panel, light sources disposed at opposite ends of the optical conductor plate, and a reflector sheet disposed rearwardly of the optical conductor plate and in parallel therewith, for reflecting light, toward the liquid crystal display panel. The optical conductor plate is provided, at side ends different from the opposite ends where the light sources are arranged, with engaging mechanisms for engagement with the window frame. The engaging mechanisms have, upon engagement with the window frame, a front to back thickness which is smaller than that of the optical conductor plate.

More specifically, in the liquid crystal lighting apparatus constructed as above, an optical conductor plate 11 is provided, at side ends 22 different from the opposite ends where the light sources are arranged 21, with engaging mechanisms 31 for engagement with a window frame 16. At that time, since the rearmost end of the engaging mechanism 31 is so set as to not project rearwardly of the reflector sheet 13, the thickness reduction of the whole liquid crystal lighting apparatus can be accomplished, similar to the apparatus according to the one aspect of the invention.

According to still another aspect of the invention, in a liquid crystal lighting apparatus comprising a lighting apparatus main body arranged rearwardly of a liquid crystal display panel, an optical conductor plate disposed in parallel to the liquid crystal display panel and disposed within the lighting apparatus main body, light sources arranged at opposite ends of the optical conductor plate, a reflector sheet disposed rearwardly of the optical conductor plate and in parallel therewith, for reflecting light plate, toward the liquid crystal display panel, a diffusion sheet disposed between the optical conductor plate and the liquid crystal display panel and in parallel therewith, for making the brightness of light emitted from the optical conductor plate uniform, and light source reflectors for reflecting light, emitted from the light sources, toward the optical conductor plate. The lighting apparatus main body includes a window frame disposed between the liquid crystal panel and the optical conductor plate and a support disposed rearwardly of the optical conductor plate, so that the optical conductor plate is clamped between the window frame and support. Ends of the reflector sheet which are close to the light sources are cut out to expose back ends of the optical conductor plate. Further, ends of the diffusion sheet which are close to the light sources are cut out to expose front ends of the optical conductor plate. The light source reflectors are fixed directly to exposed portions of the optical conductor plate which are clear of the reflector sheet and diffusion sheet. The lighting apparatus main body clamps each of the light source reflectors through its front and back surfaces.

To manufacture the liquid crystal lighting apparatus having the above construction, upon placing the diffusion plate and reflector sheet into close contact to the optical conductor plate, opposite ends, close to the light sources, of the diffusion sheet are cut out. Further, opposite ends, close to the light sources, of the reflector sheet are cut out to expose strip portions of the front and back surfaces of the optical conductor plate. After the light sources are disposed at the opposite ends of the optical conductor plate, the light source reflectors are fixed directly to the front and back portions of the optical conductor plate which are clear of the reflector sheet and diffusion sheet. Subsequently each of the light source reflectors is clamped and held through its front and back by the window frame and the support.

Since the light source reflectors are fixed directly to the exposed light incident ends of the optical conductor plate as described above, the thickness of each of the reflector sheet and diffusion sheet can be neglected as compared to the prior art to accomplish the thickness reduction of the liquid crystal lighting apparatus.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will becomes apparent to those skilled in the art from this detailed description.

DESCRIPTION OF THE PREFERRED EMBODIMENTS

The invention will now be described by way of example with reference to the accompanying drawings.

Figure 4:
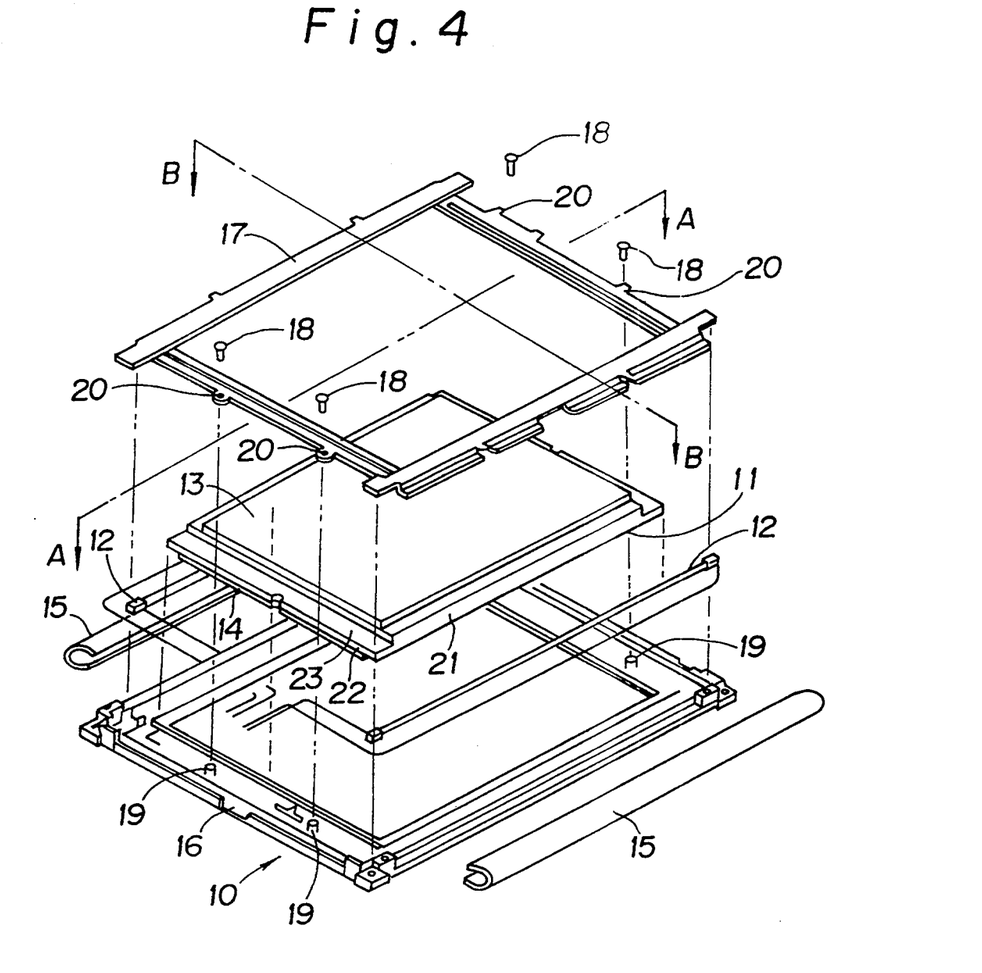
FIG. 4 is a perspective view showing an embodiment of a liquid crystal lighting apparatus according to the invention.
Figure 5:
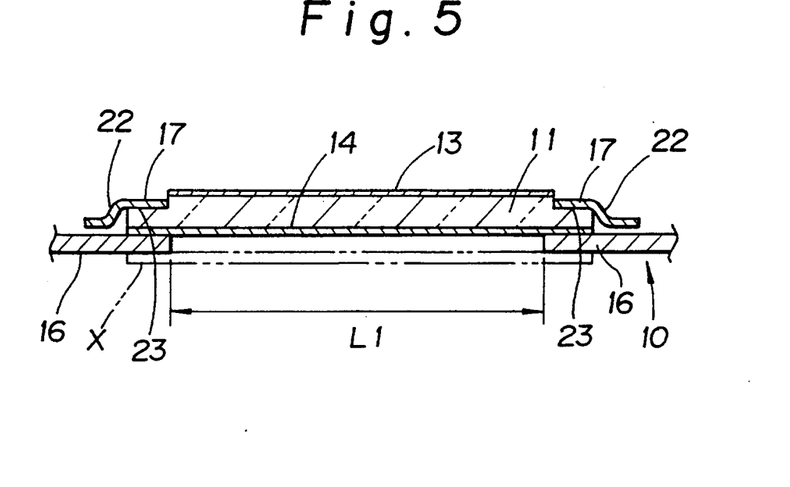
FIG. 5 is a sectional view from the line A—A of FIG. 4.
Figure 6:
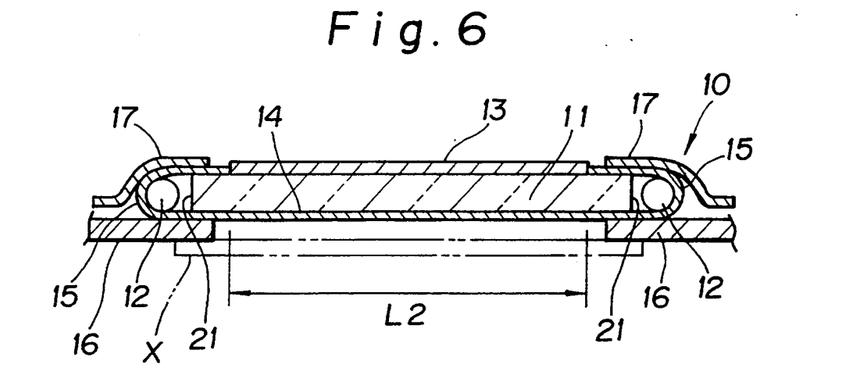
FIG. 6 is a sectional view from the line B—B of FIG. 4.

FIG. 4 is a perspective view showing an embodiment of a liquid crystal lighting apparatus according to the invention. FIG. 5 is a sectional view from the line A—A of FIG. 4. Finally FIG. 6 is a sectional view from the line B—B of FIG. 4.

As shown in these figures, the liquid crystal lighting apparatus of this embodiment is an edge light type lighting apparatus adapted to backlight a liquid crystal display panel X. It comprises a lighting apparatus main body 10 arranged rearwardly of the liquid crystal display panel X; an optical conductor plate 11 extending in parallel with the liquid crystal display panel X within the lighting apparatus main body 10; light sources 12 arranged at opposite ends of the optical conductor plate 11; a reflector sheet 13 disposed rearwardly of the optical conductor plate 11 and in parallel therewith, for reflecting light traveling to the back side within the optical conductor plate 11, toward the liquid crystal display panel X; a diffusion sheet 14 disposed between the optical conductor plate 11 and liquid crystal display panel X and extending in parallel therewith, for maintaining uniform brightness of light from the optical conductor plate 11 and incident upon the liquid crystal display panel X; and light source reflectors 15 for reflecting light, emitted from the light sources 12 and initially traveling in a direction opposite to the optical conductor plate 11, toward the optical conductor plate 11.

The lighting apparatus main body 10 includes a window frame 16 disposed between the liquid crystal panel and the optical conductor plate 11 and a support 17 made of metal, disposed rearwardly of the optical conductor plate 11, so that the optical conductor plate 11 is clamped between the window frame 16 and support 17.

The window frame 16 is made of, for example, plastic having a plan view form of □-letter shape, through which the illuminating place can be seen from a front view and which has an outer edge formed with first thread holes 19 so that the window frame 16 may be brought into engagement with the support 17 by screws 18.

The support 17 (cap bezel) is a metal chassis having a thickness of, for example, about 0.5 mm and, the support 17 is bent rearwardly at four side strip portions in accordance with the sum of thickness of side ends 22 of the optical conductor plate 11 and thickness of the light source reflector 15 in order to hold the optical conductor plate 11 and light source reflectors 15 as will be described later. The support 17 has a plan view form of □-letter shape. The outer edge of the support 17 is formed with second thread holes 20 in correspondence to the first thread holes 20 of the window frame 16. The screws 18 pass through the second thread holes 20.

Used as the optical conductor plate 11 is an acrylic resin having, for example, a total light transmittivity of 93% and a refractive index n of 1.49. As shown in FIGS. 4 to 6, the optical conductor plate 11 is formed into a flat plate having a length of about 20.5 cm, a width of about 15.5 cm and a thickness of 0.5 to 0.6 cm.

Of the four side portions of the optical conductor plate 11, side ends 22, different from light incident ends 21 at which the light sources 12 are disposed are cut out at their back portions to form steps 23 for abutment with the support 17, as shown in FIG. 5. The depth of the step 23 is set to about 0.8 mm. The thus set depth is so large that upon abutment of the support 17 on the steps 23, the thickness between the window frame 16 and support 17 is smaller than the thickness between the window frame 16 and reflector sheet 13. The step 23 extends toward the illuminating plane by a length which is determined by taking into account an effective illumination area L1 of the light source 12 and an effective display area L2 of the liquid crystal display panel X.

Used as the light source 12 is a hot cathode tube of linear type (CCFT) consisting of a luminous element such as a filament, and an envelope enclosing the element. For example, the light source 12 has a diameter of 4.1 mm, a tube surface brightness value of 16000nt and a power consumption value of 5 W.

Used as the reflector sheet 13 is an existing mirror surface reflector, light scattering acryl plate or the like having a thickness of, for example, about 0.18 mm. Opposite ends, close to the light sources 12, of the reflector sheet 13 are cut out in the form of a strip to expose back end portions of the optical conductor plate 11.

The diffusion sheet 14 is a milk-white synthetic resin plate having, for example, a thickness of about 0.25 mm and a transmittivity of 91% for visual rays of 600 nm wavelength. Opposite ends, close to the light source 12, of the diffusion sheet 14 are cut out in the form of a strip to expose front end portions of the optical conductor plate 11.

The light source reflector 15 is a reflector formed of a metal plate of, for example, about 0.1 mm thickness having a high reflection efficiency. Further, it is worked so as to be bent, so as to have, at the central portion, a cross section of C-shape. By using an adhesive of, for example, resin system, the reflector 15 is fixed directly to the exposed strip portions of the light incident end 21 of the optical conductor plate 11 which are clear of the reflector sheet 13 and diffusion sheet 14. The light source reflector 15 is pressed by the support 17 to the window frame 16 so as to be clamped by the support and window frame through its front and back surfaces.

The liquid crystal lighting apparatus having the above construction is manufactured as will be described below.

Firstly, as shown in FIGS. 4 and 5, the back of the optical conductor plate 11 is cut out at the side ends 22 different from the light incident ends 21 to form steps 23 so that the optical conductor plate may be thinner at the side ends 22 than at the light incident ends 21. At that time, the depth of the step 23 is set to, for example, 0.8 mm, so as to be larger than the thickness of the support 17 as shown in FIG. 5.

Subsequently, the diffusion sheet 14 and reflector sheet 13 are bonded to the front and back of the optical conductor plate 11, respectively. During this procedure, as shown in FIG. 6, opposite ends, close to the light sources 12, of the diffusion sheet 14 are cut out in the form of a strip and opposite ends, close to the light sources 12, of the reflector sheet 13 are also cut out in the form of a strip, so that the front and back of the optical conductor plate 11 are partly exposed.

Then, as shown in FIG. 6 the light sources 12 are disposed at the light incident ends 21 of the optical conductor plate 11 and the light source reflector 15 is then fixed, using an adhesive of resin system for example, directly to the exposed strip front and back portions of the light incident end 21 of the optical conductor plate 11 which are clear of the reflector sheet 13 and diffusion sheet 14.

Thereafter, a resulting structure is placed on the window frame 16 and the support 17 is brought into abutment on the back of the resulting structure. At that time, two sides, in association with the light incident ends 21, of the support 17 of □-letter shape are brought into abutment on the light source reflectors 15 as shown in FIG. 6. Further, the remaining two sides contiguous to the former two sides are brought into direct abutment on the steps 23 as shown in FIG. 5. The window frame 16 and support 17 are fixed to each other by the screws 18.

At that time, since as shown in FIG. 5 the optical conductor plate 11 formed with the steps 23 at the side ends 22 other than the light incident ends 21 is reduced in thickness, the support 17 abutting on the steps can be prevented from projecting rearwardly of the reflector plate 13 and for the thickness of the optical conductor plate 11 being, for example, 5.0 mm, the total thickness of the step and support can be about 5.43 mm and so reduced by about 0.5 mm, which is the thickness of the support 17, as compared to the prior art shown in FIG. 2.

In addition, since as shown in FIG. 6 the light source reflector 15 is fixed directly to the exposed portions of light incident end 21 of the optical conductor plate 11, the total thickness of the light source reflector and exposed portion of optical conductor plate can be about 5.7 mm and reduced by about 0.43 mm which is the sum of thickness of the reflector sheet 13 and diffusion sheet 14, as compared to the prior art shown in FIG. 3. Accordingly, a significant thickness reduction can be ensured through the independent use of the technique shown in FIG. 5 or 6.

In this case, because of interposition of the diffusion sheet 14 between the window frame 16 and optical conductor plate 11 as shown in FIG. 5, there occurs a gap of about 0.15 mm between the window frame 16 and light source reflector 15. Even with this gap in mind, the total thickness measured from the window frame 16 is about 5.58 mm, indicating that a reduction of about 0.28 mm can be achieved in comparison with the total thickness in the prior art which is about 6.13 mm. In this manner, the thickness reduction of the whole liquid crystal lighting apparatus can be accomplished.

When the liquid crystal lighting apparatus is in use, light emitted from the light sources 12 and heading inwardly, goes into the optical conductor plate 11 through the light incident ends 21. On the other hand, light emitted from the light sources 12 and heading outwardly is reflected by the light source reflectors 15 and then goes into the optical conductor plate 11 through the light incident ends 21.

Thereafter, the light travelling within the optical conductor plate is reflected to the front side by means of the reflector sheet 13 and distributed by means of the diffusion sheet 14. Thus, the light is distributed substantially uniformly through the diffusion sheet 14 and irradiated on the back of the liquid crystal display panel X.

In this operation, by virtue of the thickness of the light incident end 21 of optical conductor plate 11 remaining unchanged as compared to the prior art shown in FIGS. 1 to 3, the incident area of light from the light sources 12 can be large as that of the prior art. Accordingly, even when the thickness of the liquid crystal lighting apparatus is reduced as set forth above, the brightness at the illuminating plane will not be reduced.

As will be seen from the foregoing, the thickness can be reduced in comparison with the prior art without changing brightness characteristics to meet the thickness reduction of color LCD units complying with the market needs for reduction in weight, thickness and size.

Figure 7:
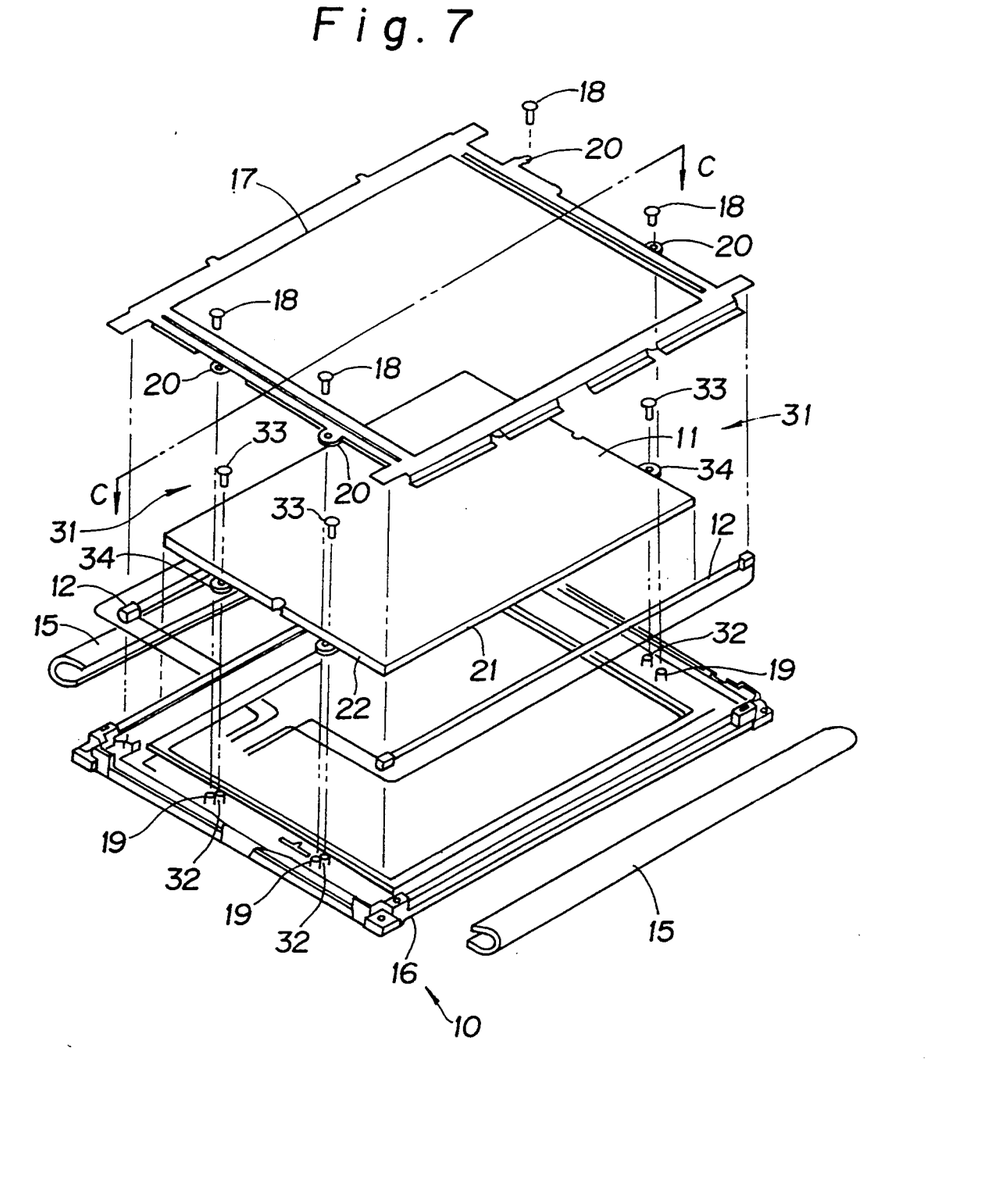
FIG. 7 is a perspective view showing another embodiment of the liquid crystal lighting apparatus according to the invention.
Figure 8:
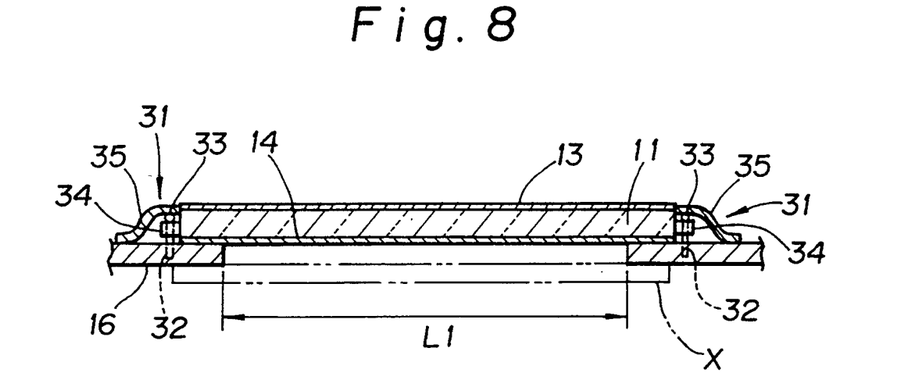
FIG. 8 is a sectional view from the line C—C of FIG. 7.

FIG. 7 is a perspective view showing another embodiment of the liquid crystal lighting apparatus according to the invention, and FIG. 8 is a sectional view taken on the line C—C of FIG. 7.

As shown therein, the liquid crystal lighting apparatus of the present embodiment comprises engaging mechanisms 31 for engagement with a window frame 16, each engaging mechanism 31 being provided for a side end 22, different from a light incident end 21, of an optical conductor plate 11.

The engaging mechanism 31 includes third thread holes 32 formed in the window frame 16, ordinary screw members 33 made of metal to be screwed into the third thread holes 32, and thread rings 34 formed integrally directly with the side end 22 of the optical conductor plate 11 and through which the screw members 33 pass. As shown in FIG. 8, the front to back thickness of the thread ring 34 of the engaging mechanism 31 is set to be smaller than that of the optical conductor plate 11 so that, upon engagement of the optical conductor plate with the window frame 16 through the screw members 33, the rearmost ends of the screw members will not project rearwardly of the reflector sheet 13.

In the present embodiment, a guard member 35 (metal chassis) for protecting the engaging mechanisms 31 is mounted rearwardly of the engaging mechanisms 31. Therefore, the thickness of the thread ring 34 is set by taking into account the thickness of the guard member 35 so that the rearmost end of the guard member 35 does not project rearwardly of the reflector sheet 13.

Since in the present embodiment the engaging mechanism 31 does not project rearwardly of the reflector sheet 13, the thickness of the liquid crystal lighting apparatus can be reduced while maintaining the same thickness of the light incident end 21 of optical conductor plate 11 as that of the prior art, as in the case of the first embodiment shown in FIG. 5.

The present invention is in no way limited to the foregoing embodiments and obvious the foregoing embodiments may be modified and changed in various ways within the framework of the invention.

For example, while in the foregoing embodiments the support 17 is formed into the □-letter shape and is partly brought into abutment with the light source reflectors and partly brought into direct abutment with the optical conductor plate 11, the construction of the support 17 is not limited thereto and may be modified. For example, the support 17 can be constructed of two strips to hold only the steps 23 of the optical conductor plate 11 or only the light source reflectors 15 disposed at the light incident ends 21 of the optical conductor plate 11.

Figure 9:
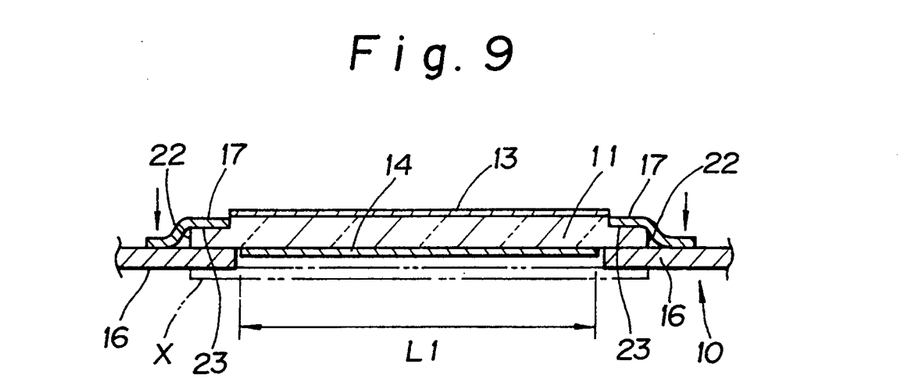
FIG. 9 is a sectional view showing still another embodiment of the liquid crystal lighting apparatus according to the invention.

Further, in the foregoing embodiments, the diffusion sheet 14 may not be cut out to expose portions, different from the light incident ends 21, of the optical conductor plate 11 as shown in FIG. 5. Alternatively, as shown in FIG. 9, the corresponding portion of the diffusion sheet 14 may be cut out so that the front of the optical conductor plate 11 can be brought into direct abutment on the window frame 16. In this case, the thickness reduction can be promoted further by reduction of the thickness of the diffusion sheet 14.

Figure 10:
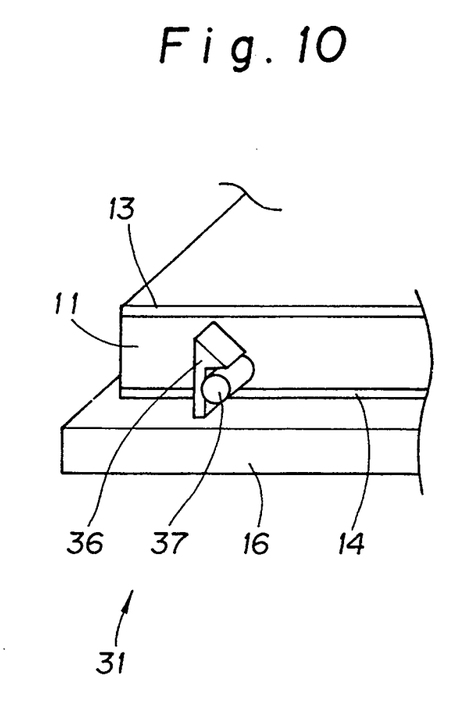
FIG. 10 is a fragmentary sectional view showing an example of the window frame engaging mechanisms in the liquid crystal lighting apparatus according to the invention.

In the embodiment of the apparatus according to the invention described with reference to FIG. 7, the engaging mechanism 31 is constructed of the third thread holes 32 in the window frame 16, screw members 33 and thread rings 34 of the optical conductor plate 11. However, this construction is in no way limitative and for example, as shown in FIG. 10, an engaging mechanism may be comprised of a resilient hook 36 formed on the window frame 16 and a projection 37 extending from the side end 22 of the optical conductor plate 11 to engage the resilient hook 36.

As is clear from the foregoing description, since according to the construction of the invention the side ends, different from the light incident ends, of the optical conductor plate, are cut out to form the steps, the support abutting on the steps is prevented from projecting rearwardly of the reflector sheet.

Moreover, according to further construction of the invention, the thickness of the engaging mechanisms provided for the side ends different from the light incident ends is made to be smaller than that of the light conductor plate. Therefore, the rearmost ends of the engaging mechanisms can be prevented from projecting rearwardly of the reflector sheet.

Moreover, according to still further construction of the invention, the reflector sheet and diffusion sheet are cut out in the form of a strip near the light incident end surfaces and the light source reflectors are fixed directly to exposed portions of the optical conductor plate which are clear of the reflector sheet and diffusion sheet. Consequently, in comparison with the prior art, the thickness of the apparatus can be reduced by neglecting the thicknesses of the reflector sheet and diffusion sheet without decreasing the thickness of the light incident end surfaces of the optical conductor plate.

As described above, the present invention can meet the needs for thickness reduction without decreasing the incident areas of light from the light sources.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal lighting apparatus comprising:
a lighting apparatus main body disposed rearwardly of a liquid crystal display panel;
an optical conductor plate, parallel to said liquid crystal display panel, arranged within said lighting apparatus main body;
light sources disposed at opposite sides of said optical conductor plate; and
a reflector sheet disposed rearwardly of said optical conductor plate and in parallel therewith, for reflecting light traveling toward a rear side of said optical conductor plate, toward said liquid crystal display panel,
said lighting apparatus main body including a window frame disposed between the liquid crystal panel and said optical conductor plate, and a support disposed rearwardly of said optical conductor plate, for clamping said optical conductor plate between said window frame and support,
said optical conductor plate being reduced in thickness at opposite sides, different from the light source sides, to form steps, said support abutting said steps, said steps having a depth making a thickness between said window frame and said support smaller than a thickness between said window frame and said reflector sheet.

2. A liquid crystal lighting apparatus comprising:
a window frame disposed rearwardly of a liquid crystal display panel;
an optical conductor plate disposed rearwardly of said window frame and in parallel with said liquid crystal display panel;
light sources disposed at opposite sides of said optical conductor plate; and
a reflector sheet disposed rearwardly of said optical conductor plate and in parallel therewith, for reflecting light traveling toward a rear side of said optical conductor plate, toward said liquid crystal display panel,
said optical conductor plate being provided, at opposite sides, different from the light source sides, with engaging mechanisms for engagement with said window frame, said engaging mechanisms having, upon engagement with said window frame, a thickness smaller than a thickness of said optical conductor plate.

3. A liquid crystal lighting apparatus comprising:
a lighting apparatus main body disposed rearwardly of a liquid crystal display panel;
an optical conductor plate, parallel to said liquid crystal display panel, arranged within said lighting apparatus main body;
light sources disposed at opposite sides of said optical conductor plate;
a reflector sheet disposed rearwardly of said optical conductor plate and in parallel therewith, for reflecting light traveling toward a rear side of said optical conductor plate, toward said liquid crystal display panel; a diffusion sheet disposed between said optical conductor plate and said liquid crystal display panel and in parallel therewith, for providing uniform brightness of light emitted from said optical conductor plate; and
light source reflectors for reflecting light, emitted from said light sources and traveling outwardly from said optical conductor plate, toward said optical conductor plate,
said lighting apparatus main body including a window frame disposed between the liquid crystal panel and said optical conductor plate, and a support disposed rearwardly of said optical conductor plate, for clamping said optical conductor plate between said window frame and support,
edges of said reflector sheet proximate to said light sources being removed to expose rear ends of said optical conductor plate to contact with said light source reflectors, edges of said diffusion sheet proximate to said light sources being removed to expose front ends of said optical conductor plate to contact with said window frame, to thereby provide a display element lighting apparatus of reduced thickness.

4. A display element lighting apparatus, comprising an optical conductor;
light sources disposed at opposite sides of the optical conductor;
a frame, disposed between the display element and the optical conductor; and
a support, disposed rearward of the optical conductor,
said optical conductor being reduced in thickness at edges of opposing sides, different from the light source sides, wherein said support abuts said edges and said reduction in thickness is greater than a thickness of said support to thereby provide a display element lighting apparatus of reduced thickness.

5. The display element lighting apparatus of claim 4, further comprising:
a reflector sheet, contacting a rear side of the optical conductor, for reflecting light traveling toward a rear side of said optical conductor, toward the display element,
said reduction in thickness of edges of opposing sides of said optical conductor creating a thickness between said frame and said support which is less than a thickness between said frame and said reflector sheet.

6. The display element lighting apparatus of claim 5, further comprising:
light source reflectors, disposed outward of the light sources and contacting the optical conductor on a front and rear side, said reflector sheet contacting said rear side of the optical conductor between opposing light source reflectors in a first direction, and between points of the reduced thickness in a second direction, opposite the first direction.

7. The display element lighting apparatus of claim 6, wherein a thickness of the reflector sheet is less than a combined thickness of the light source reflectors and the support contacting the light source reflectors.

8. The display element lighting apparatus of claim 6, further comprising:
a diffusion sheet, contacting a front side of said optical conductor between opposing light source reflectors in the first direction, for providing uniform brightness of light emitted from the optical conductor to the display element.

9. The display element lighting apparatus of claim 6, further comprising:
a diffusion sheet, contacting a front side of said optical conductor, for providing uniform brightness of light emitted from the optical conductor to the display element,
said frame contacting the front side of the optical conductor at edges of opposing sides, different from the light source sides, and said diffusion sheet contacting the front side of the optical conductor between said edges of the optical conductor contacting said frame in the second direction.

10. The display element lighting apparatus of claim 9, wherein a thickness of the diffusion sheet is less than a thickness of said frame.

11. A display element lighting apparatus, comprising:
an optical conductor;
light sources disposed at opposing sides of the optical conductor;
a frame, disposed between the display element and the optical conductor;
engaging mechanisms, attaching opposing sides of the optical conductor, different from the light source sides, to the frame;
a guard member contacting the frame and the engaging mechanism on each of the attached opposing sides of the optical conductor; and
a reflector sheet, contacting a rear side of the optical conductor, for reflecting light traveling toward a rear side of the optical conductor, toward the display element,
a combined thickness of the frame, engaging mechanism, and guard member, at each attached opposing side, being less than a combined thickness of the frame, optical conductor, and reflector sheet, to thereby provide a display element lighting apparatus of reduced thickness.

12. The display element lighting apparatus of claim 11, wherein the engaging mechanisms each include:
a thread ring formed integrally with a side end of the optical conductor;
a screw, screwed through the thread ring into a thread hole in the frame to thereby attach the optical conductor to the frame.

13. The display element lighting apparatus of claim 11, further comprising:
light source reflectors, disposed outward of the light sources and contacting the optical conductor on a front and rear side,
said reflector sheet contacting said rear side of the optical conductor between opposing light source reflectors in a first direction, and between points of the reduced thickness in a second direction, opposite the first direction.

14. The display element lighting apparatus of claim 13, wherein a thickness of the reflector sheet is less than a combined thickness of the light source reflectors and the support contacting the light source reflectors.

15. The display element lighting apparatus of claim 14, further comprising:
a diffusion sheet, contacting a front side of said optical conductor between opposing light source reflectors in the first direction, for providing uniform brightness of light emitted from the optical conductor to the display element.

16. The display element lighting apparatus of claim 14, further comprising:
a diffusion sheet, contacting a front side of said optical conductor, for providing uniform brightness of light emitted from the optical conductor to the display element,
said frame contacting the front side of the optical conductor at edges of opposing sides, different from the light source sides, and said diffusion sheet contacting the front side of the optical conductor between said edges of the optical conductor contacting said frame in the second direction.

17. The display element lighting apparatus of claim 16, wherein a thickness of the diffusion sheet is less than a thickness of said frame.

* * * * *